United States Patent
Gundlach

(10) Patent No.: US 8,651,926 B2
(45) Date of Patent: Feb. 18, 2014

(54) ICE SEPARATOR FOR AN AIR DUCT

(75) Inventor: Till Gundlach, Jork (DE)

(73) Assignee: Airbus Operations GmbH, Hamburg (DE)

( * ) Notice: Subject to any disclaimer, the term of this patent is extended or adjusted under 35 U.S.C. 154(b) by 776 days.

(21) Appl. No.: 12/842,544

(22) Filed: Jul. 23, 2010

(65) Prior Publication Data

US 2011/0021129 A1 Jan. 27, 2011

Related U.S. Application Data

(60) Provisional application No. 61/228,036, filed on Jul. 23, 2009.

(30) Foreign Application Priority Data

Jul. 23, 2009 (DE) .......................... 10 2009 034 410

(51) Int. Cl.
*B64D 13/00* (2006.01)

(52) U.S. Cl.
USPC .......................................................... 454/76

(58) Field of Classification Search
USPC ........ 454/71, 72, 73, 74, 76, 309, 333, 134 R
See application file for complete search history.

(56) References Cited

U.S. PATENT DOCUMENTS

| | | | |
|---|---|---|---|
| 3,355,905 A | 12/1967 | Berhold et al. | |
| 5,123,501 A * | 6/1992 | Rothman et al. | 181/239 |
| 6,389,826 B2 * | 5/2002 | Buchholz et al. | 62/172 |
| 8,394,163 B2 * | 3/2013 | Hildebrand et al. | 55/440 |
| 2009/0032330 A1 | 2/2009 | Holmgren et al. | |

FOREIGN PATENT DOCUMENTS

| | | |
|---|---|---|
| AU | 753367 B2 * | 10/2002 |
| DE | 352654 C | 5/1922 |
| DE | 543466 A | 2/1932 |
| DE | 1679516 C | 8/1967 |
| DE | 102006018404 A1 | 10/2007 |

OTHER PUBLICATIONS

German Office Action for German Application No. 10 2009 034 410.1-22 mailed Jul. 23, 2010.

* cited by examiner

*Primary Examiner* — Steven B McAllister
*Assistant Examiner* — Brittany E Towns
(74) *Attorney, Agent, or Firm* — Ingrassia Fisher & Lorenz P.C.

(57) ABSTRACT

An ice separator is provided that includes, but is not limited to at least one curved airflow deflection surface. The ice separator includes, but is not limited to an inflow aperture with a downstream trapping pocket at the airflow deflection surface, in which trapping pocket ice particles from an airflow flowing onto the ice separator are trapped due to their inertial forces. In this way with simple means an effective device for removing ice particles from airflow may be achieved.

20 Claims, 6 Drawing Sheets

ICE SEPARATOR FOR AN AIR DUCT

REFERENCE TO RELATED APPLICATIONS

This application claims the benefit of the filing date of German Patent Application No. 10 2009 034 410.1 filed Jul. 23, 2009 and of U.S. Provisional Patent Application No. 61/228,036 filed Jul. 23, 2009, the disclosures of which applications are hereby incorporated herein by reference.

TECHNICAL FIELD

The invention relates to an ice separator for an air duct, an air distribution system in an aircraft, the use of an ice separator, as well as an aircraft comprising at least one air duct and one ice separator.

BACKGROUND

To provide life support to on-board passengers and to increase the comfort within a passenger cabin, aircraft comprise an air conditioning system that guides conditioned air through a multitude of air outlets into a passenger cabin. In particular operating conditions with high outside temperatures and high ambient humidity, air conditioning packs may discharge ice that may accumulate in adjacent pipes of an air distribution system. In order to prevent pressure losses, this accumulated ice is cyclically defrosted, during which process larger ice accumulations may become detached. They comminute when impacting downstream pipe walls and at times enter the passenger cabin. The ice particles are of a size that is approximately comparable to the size of hail.

In order to prevent such a situation, it is known to use grille-shaped retention elements at appropriate locations in an air distribution system, which retention elements retain the ice particles. Due to the relatively arbitrary size distribution of the ice particles it may be observed that many ice particles pass without hindrance through the grille-shaped retention elements, or may at least partly block the apertures. A necessary maximum diameter of the apertures of a retention element for reliably retaining all the ice particles would, furthermore, cause possibly unjustifiable pressure losses in the particular air distribution system.

A further known measure to prevent the above-mentioned situation consists of individual air outlets within a passenger cabin, which are in particular affected by the passage of ice particles, to be at least partly filled with a bulked material that retains ice particles. However, this is not a satisfactory solution because the pressure loss at the respective air outlets is very considerable, and because the actual function is restricted or entirely prevented.

Accordingly, it is at least one object of the invention to propose a device for preventing the passage of ice particles from an air conditioning system to a passenger cabin of an aircraft, which device retains as reliably as possible ice particles of any size without however increasing the flow resistance of an air duct or of a corresponding air outlet. It may be a further object of the invention to propose such a device that comprises a mechanically particularly simple design and is practically maintenance free. In addition, other objects, desirable features, and characteristics will become apparent from the subsequent summary and detailed description, and the appended claims, taken in conjunction with the accompanying drawings and this background.

SUMMARY

According to an embodiment of the invention, the objects, other objects, desirable features and characteristics may be met by an ice separator. According to a first embodiment of the invention, the ice separator may comprise at least one first continuously curved airflow deflection surface with an introduction region arranged on a front edge of the first airflow deflection surface, and a discharge region arranged on a rear edge of the first airflow deflection surface. The front edge tangent of the first airflow deflection surface and the rear edge tangent of the first airflow deflection surface may form an angle of less than approximately 180° relative to each other. Between the front edge and the rear edge the first airflow deflection surface comprises an inflow edge, from which an inflow aperture with a downstream trapping pocket extends to the front edge. The trapping pocket may be arranged on one side of the first airflow deflection surface that faces away from the centre of curvature of the first airflow deflection surface.

According to this description, a curved first airflow deflection surface may be provided that is designed in such a manner that air is deflected by a certain angle from an introduction region to a discharge region. This may, for example, take place in pipelines that comprise an angle section or in air branching pieces in which an incoming airflow is divided into two or more outgoing air flows. In branching pieces frequently flow deflection into two or more different directions takes place. Since airflow without influence from the outside principally tends to carry out a linear translation, the first airflow deflection surface exerts a particular force on an airflow flowing from the introduction region to the discharge region. If the airflow comprises ice particles, they too tend to move linearly. Due to the inflow aperture arranged on the airflow deflection surface the ice particles therefore reach the downstream trapping pocket instead of carrying out a further curvature of their direction of flight. In other words, the centrifugal force occurring during deflection of the flow drives the ice particles into the inflow aperture.

The trapping pocket causes the ice particles to be retained so that they do not move on. Air which in the use in air conditioning systems or air distribution systems for conditioning the air of aircraft cabins comprises a temperature above approximately zero always flows around the ice particles contained in the trapping pocket. Consequently the ice particles slowly melt and in so doing at the same time also at least slightly increase the humidity of the airflow.

In this arrangement the trapping pocket is to be dimensioned in such a manner that adequate holding capacity for the quantity of ice particles, which quantity has been determined by experiments, typically arises. Furthermore, the position of the inflow aperture is, likewise, to be selected in the same manner so that if possible a maximum of arising ice particles may find their way into this inflow aperture. The position of the inflow apertures is upstream, depending on the course of the pipe, because the ice particle flow in the upstream pipe-bends already concentrates on one side of the pipe.

By means of this first concept according to an embodiment of the invention, with a technically simple design, a very effective device is provided which may eliminate the majority of ice particles in airflow independently of the size of the ice particles without increasing the air resistance to the airflow concerned.

Particularly preferably, the angle enclosed between the front edge tangent and the rear edge tangent is adapted to rang from approximately 90° to approximately 135°. Consequently the ice separator according to the invention is suitable both for use in air branching pieces and in angled pipeline pieces.

An advantageous embodiment of the ice separator according to the invention further comprises a rounded leading edge that is arranged so as to be flush on the front edge of the first airflow deflection surface. This provides a particularly harmonic flow introduction on the ice separator, which is advantageous from the point of view of flow resistance and noise development.

Particularly preferably, the ice separator according to an embodiment of the invention furthermore comprises a second airflow deflection surface whose front edge is arranged parallel and adjacent to the front edge of the first airflow deflection surface. This means that the ice separator according to the invention is particularly suitable for use in air branching devices.

In a particularly preferred embodiment of the ice separator according to the invention, the second airflow deflection surface is arranged so as to be mirror-inverted and symmetrical relative to the first airflow deflection surface.

Furthermore, it is preferred to arrange a rounded leading edge so that it is flush against the front edges of the first airflow deflection surface and of the second airflow deflection surface. Consequently an entering airflow may divide into two or more partial flows with little noise development and little in the way of flow losses.

Furthermore, it is particularly preferred if the trapping pocket comprises an open-pore material, which encourages the airflow around the ice particles and the melting of the ice particles. Particularly preferably the trapping pocket comprises a mesh fabric, which makes it possible to retain ice particles of different sizes.

Furthermore, it is preferred to design the first and/or the second airflow deflection surface from an open-pore material. In this arrangement, noise development during flow deflection is clearly reduced, and the pressure conditions in the upstream pipe are more homogeneous, which supports the further distribution of the air.

Finally, a preferred embodiment of the ice separator according to the invention is designed as a device for the sound-insulating deflection of airflows in air ducts. In other words, this means that by integrating an inflow aperture and a downstream trapping pocket, an already existing device for the sound-insulating deflection of airflows may be redesigned to become the ice separator according to the invention. This not only saves development costs but also manufacturing costs, because the devices for sound-insulating deflection of airflows in air ducts are already multiply used in modern air conditioning systems and air distribution systems.

Likewise, at least one object, other objects, desirable features and characteristics are met by an air distribution system that comprises at least one main air duct, at least two secondary air ducts, and at least one sound-insulating air branching piece. The air branching piece is arranged between the main air duct and the secondary air ducts, and leads air from the main air duct to the secondary air ducts. The air branching piece is designed according to the features of the ice separator according to embodiments of the invention, which then comprises a first airflow deflection surface and a second airflow deflection surface. The at least one object, other objects, desirable features and characteristics, are met by the use of an ice separator in an air duct of an aircraft.

Finally, an aircraft comprising at least one air conditioning system meets the at least one object, other objects, desirable features and characteristics. The air conditioning system comprises at least one air conditioning pack, at least one mixing chamber for mixing air from a cabin of the aircraft with fresh air, and at least one air distribution system. The air distribution system comprises at least one main air duct, at least two secondary air ducts and at least one sound-insulating air branching piece, and the air branching piece is arranged between the main air duct and the secondary air ducts and leads air from the main air duct into the secondary air ducts. In this arrangement the air branching piece is also designed according to embodiments of the invention of the ice separator according embodiments of the invention and comprises a first airflow deflection surface and a second airflow deflection surface.

BRIEF DESCRIPTION OF THE DRAWINGS

Further features, advantages and application options of the embodiments of present invention are disclosed in the following description of the exemplary embodiments and of the figures. All the described and/or illustrated characteristics per se and in any combination form the subject of the invention, even irrespective of their composition in individual claims or their references. Furthermore, identical or similar components in the figures have the same reference characters, where:

DETAILED DESCRIPTION

The following detailed description is merely exemplary in nature and is not intended to limit application and uses. Furthermore, there is no intention to be bound by any theory presented in the preceding background or summary or the following detailed description of the invention.

Figure 1:
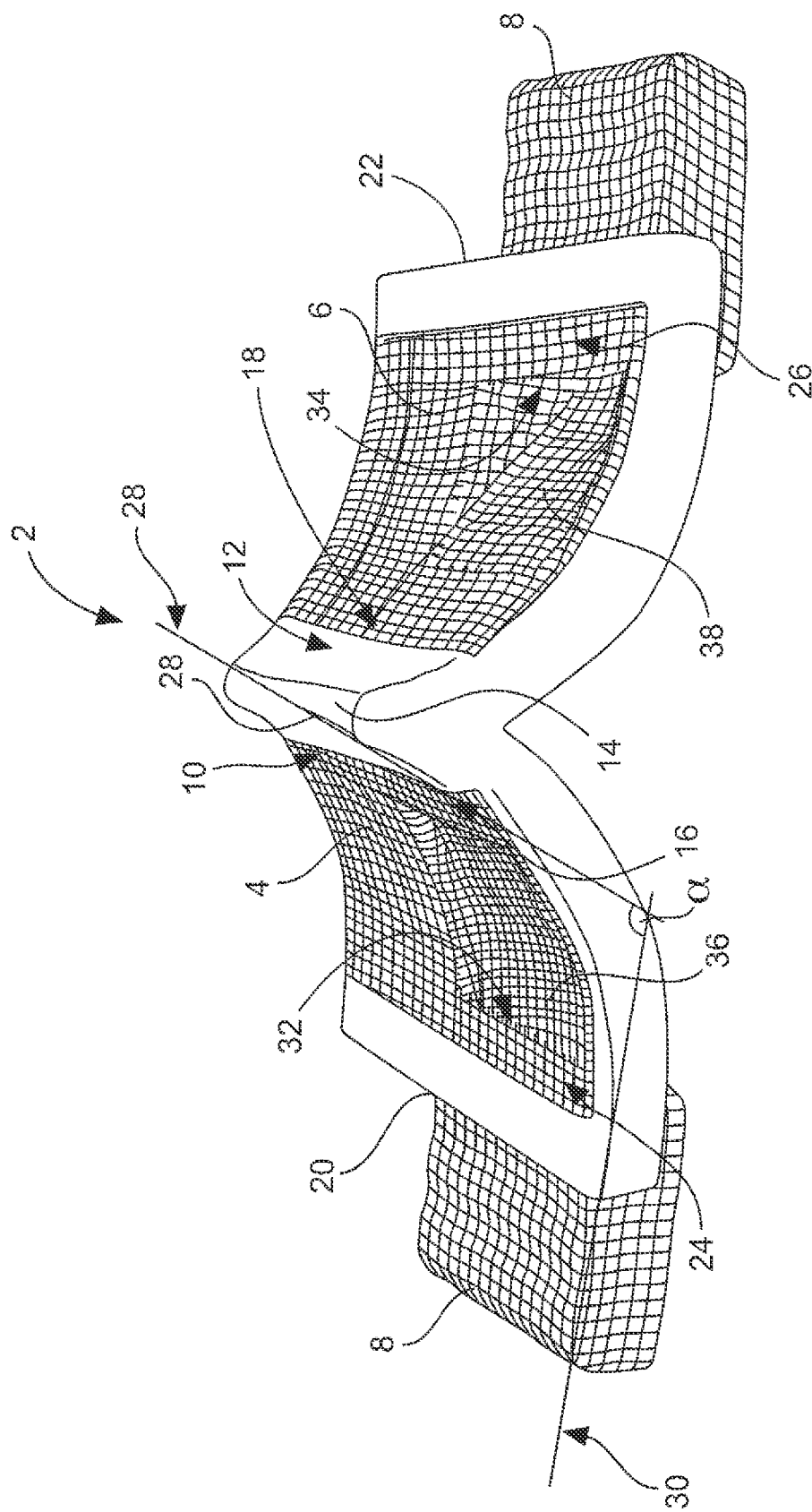
FIG. 1 shows a three-dimensional view of an ice separator according to an embodiment of the invention with a first airflow deflection surface and a second airflow deflection surface.

FIG. 1 shows an ice separator 2 according to an embodiment of the invention, comprising a first airflow deflection surface 4, a second airflow deflection surface 6 and in each case a trapping pocket 8 arranged thereon. The first airflow deflection surface 4 and the second airflow deflection surface 6 at their upper ends in the drawing plane each comprise a front edge 10 or 12, which is adjoined by a shared rounded leading edge 14. The first airflow deflection surface 4 and the second airflow deflection surface 6 are continuously curved and furthermore comprise an introduction region 16 in the region of the front edge 10 of the first airflow deflection surface 4, or an introduction region 18 in the region of the front edge 12 of the second airflow deflection surface 6. On the sides of the first airflow deflection surface 4 and the second airflow deflection surface 6, which sides face away from the front edges 10 and 12, there are rear edges 20 or 22 on which in each case a discharge region 24 or 26 is arranged.

The first airflow deflection surface 4 and the second airflow deflection surface 6 are curved in such a manner that the front edge tangent 28 (shown as an example in the drawing only in respect of the first airflow deflection surface 4) and the rear edge tangent 30 enclose an angle α that is less than approximately 180°. This deflects an airflow that impacts the leading edge 14. Due to the symmetric design this also applies to the second airflow deflection surface 6. By designing the ice separator 2 in the exemplary shape, it is possible, from one incoming airflow, to generate two outgoing airflows, with each one of them flowing out by way of one of the two airflow deflection surfaces 4 and 6.

Between the front edge 10 and the rear edge 20 or between the front edge 12 and the rear edge 22 in each case there is an inflow aperture 32 or 34, by way of which a connection to the trapping pockets 8 is created.

If an airflow encounters the leading edge 14 and is split into two separate airflows along the first airflow deflection surface 4 and the second airflow deflection surface 6, the ice particles located in the individual airflows, due to their inertial forces, reach the inflow apertures 32 and 34 and from there the respective trapping pocket 8.

The inflow apertures 32 and 34 are designed in such a manner that they comprise a bottom surface 36 or 38 that is somewhat lower than the associated airflow deflection surface 4 and airflow deflection surface 6.

Ice particles that have reached the trapping pockets 8 are held in that location by the subsequent airflow and are thawed. This means that it may be expected that the trapping pockets 8 do not become fully blocked with ice after some time, but, instead, that said trapping pockets 8 are automatically emptied as a result of the ice particles melting. The positive side-effect consists of passing air becoming slightly humidified, which could be advantageous in particular with the use within aircraft, where the cabin air is usually quite dry.

Figure 2:
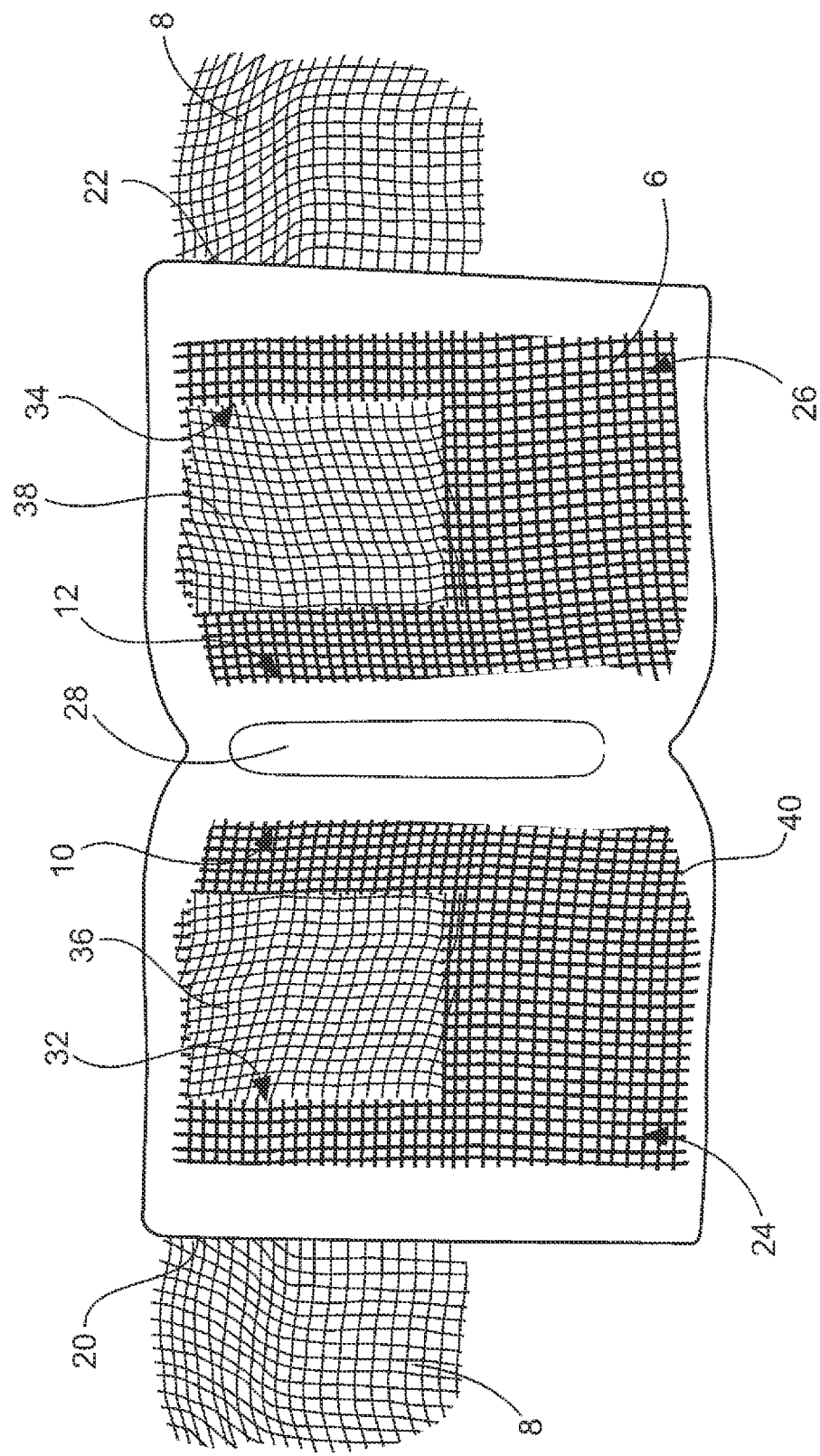
FIG. 2 shows a top view of an ice separator according to an embodiment of the invention with a first airflow deflection surface and a second airflow deflection surface.

In the top view of FIG. 2 the design of the ice separator according to the invention is further clarified. The diagram shows that the inflow apertures 32 and 34 need not necessarily be arranged symmetrically on the airflow deflection surfaces 4 and 6, but instead may be laterally offset.

The airflow deflection surfaces 4 and 6 are constructed from an open-pore material, which could, for example, be implemented by means of a mesh comprising fibre-reinforced plastic or the like. For the purpose of stabilising the material the ice separator 2 according to an embodiment of the invention could comprise an outer frame 40.

The trapping pockets 8 also comprise an open-pore material so that a continuous through flow of air is made possible and so that no turbulence effect may arise which would cause some ice particles to be thrown out again. The possibility of the airflow also being able to flow through the trapping pockets 8 results in the ice particles being reliably held in said trapping pockets 8.

Figure 3A:
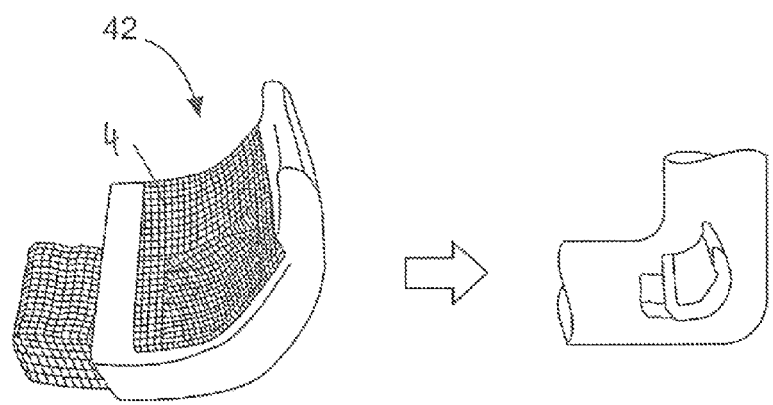
FIG. 3a shows a three-dimensional view of an ice separator according to an embodiment of the invention with a first airflow deflection surface, as well as an installation position in an air duct.
Figure 3B:
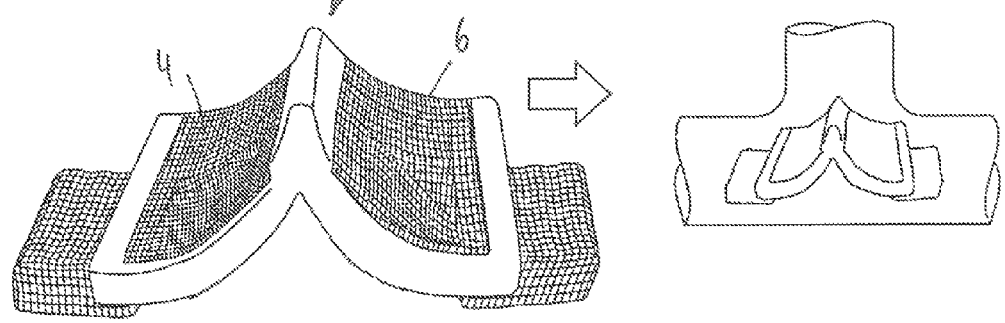
FIG. 3b shows a three-dimensional view of an ice separator according to an embodiment of the invention with a first airflow deflection surface and a second airflow deflection surface, as well as an installation position in an air duct.
Figure 3C:
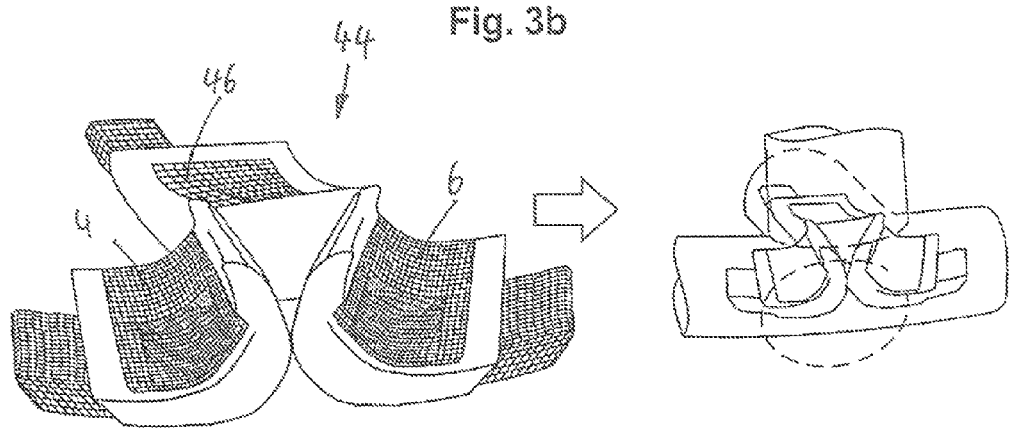
FIG. 3c shows a three-dimensional view of an ice separator according to an embodiment of the invention with a first airflow deflection surface, a second airflow deflection surface and a third airflow deflection surface, as well as an installation position in an air duct.

FIG. 3a and FIG. 3c show different exemplary embodiments in the form of an ice separator 42 according to an embodiment of the invention, comprising only a first airflow deflection surface 4, and FIG. 3c shows an exemplary embodiment of an ice separator 44 according to the invention with a first airflow deflection surface 4, a second airflow deflection surface 6 and a third airflow deflection surface 46. This ice separator 44 could, for example, be inserted in air branching pieces which from an incoming main airflow 3 generate outgoing partial airflows. FIG. 3b shows the already presented ice separator 2 according to the invention. Furthermore, for each ice separator 2, 42 and 44 shown, an installation position in a corresponding air duct is shown.

To the average person skilled in the art it is self-evident that apart from the shown ice separators 2, 42 and 44 further ice separators are imaginable that may comprise still more airflow deflection surfaces.

Figure 4A:
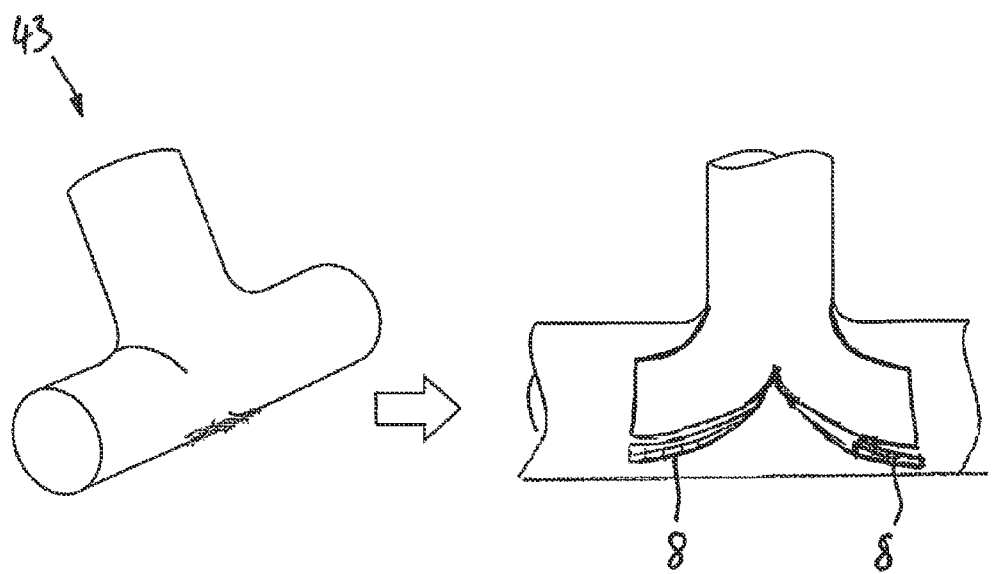
FIGS. 4a and 4b show pipe-like devices for deflecting flows, as well as shapes modified to form ice separators with respective installation positions in an air duct.
Figure 4B:
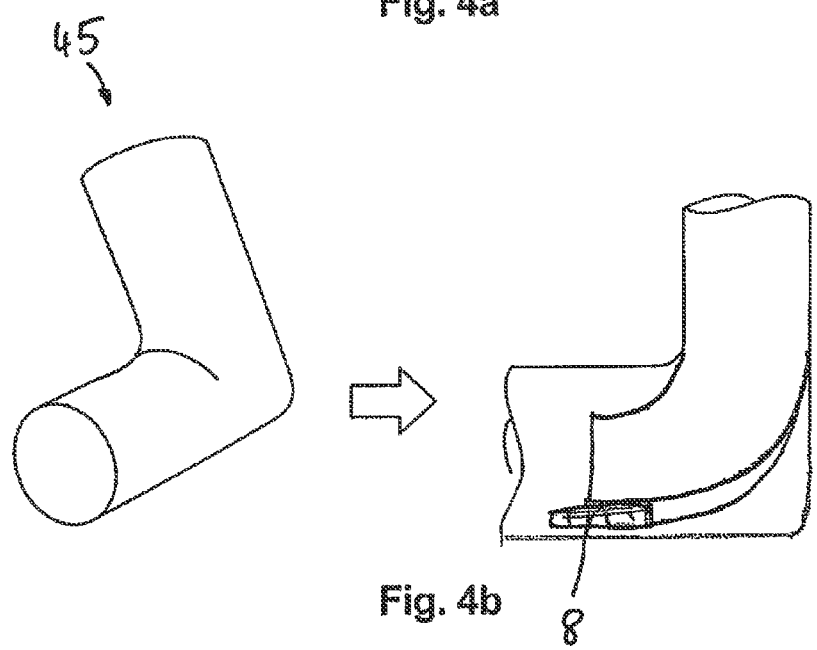

FIG. 4a and FIG. 4b show alternative views in which in each case a device 43 and 45 for deflecting flows is shown, as well as in each case a modified form to create an ice separator in an air duct. The walls of the pipe-like devices represent the airflow deflection surface. Any further forms of ice separators are imaginable in which a flow deflection and the inertial effect of ice particles may be used to advantage.

Figure 5:
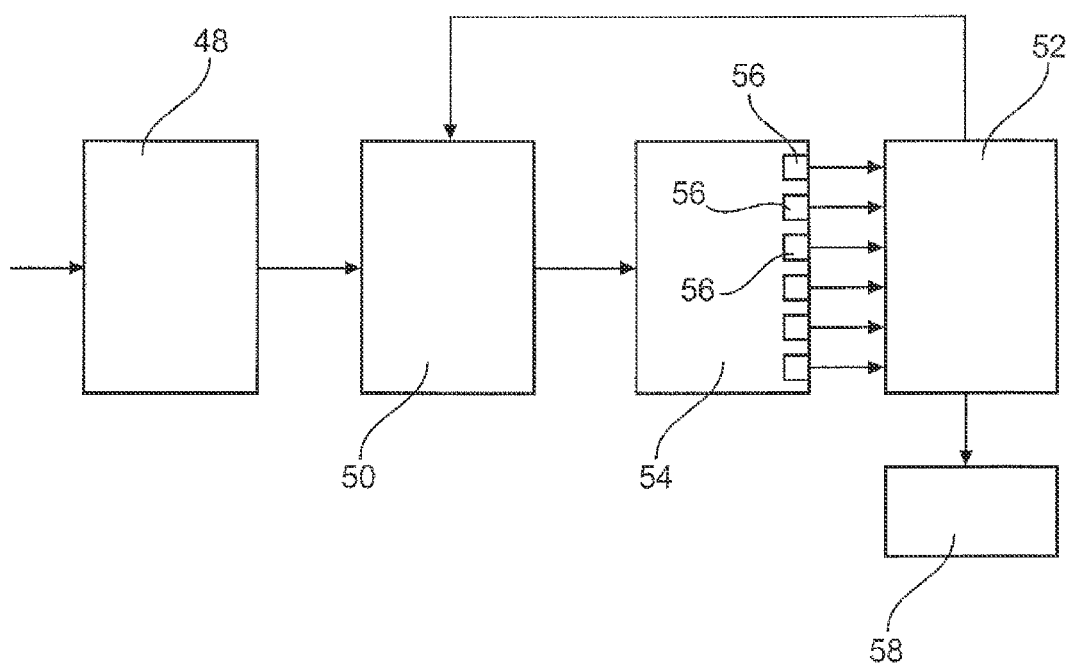
FIG. 5 shows a schematic block diagram of an example of an air conditioning system comprising an air distribution system.

FIG. 5 diagrammatically shows the design of the air conditioning systems in an aircraft that may benefit in particular from the embodiments according to the invention of the ice separator shown. Thus, an air conditioning pack 48 provides a flow of conditioned fresh air to a mixer unit 50 that mixes incoming fresh air with spent air from a passenger cabin 52. This mixed air is fed to an air distribution system 54 that comprises various air branching pieces 56 that are equipped with the ice separator according to the invention or that are expanded to become such an ice separator. For the sake of completeness it should be mentioned that part of the spent cabin air leaves the fuselage of the aircraft through the outlet valves 58 and reaches the surroundings.

Figure 6:
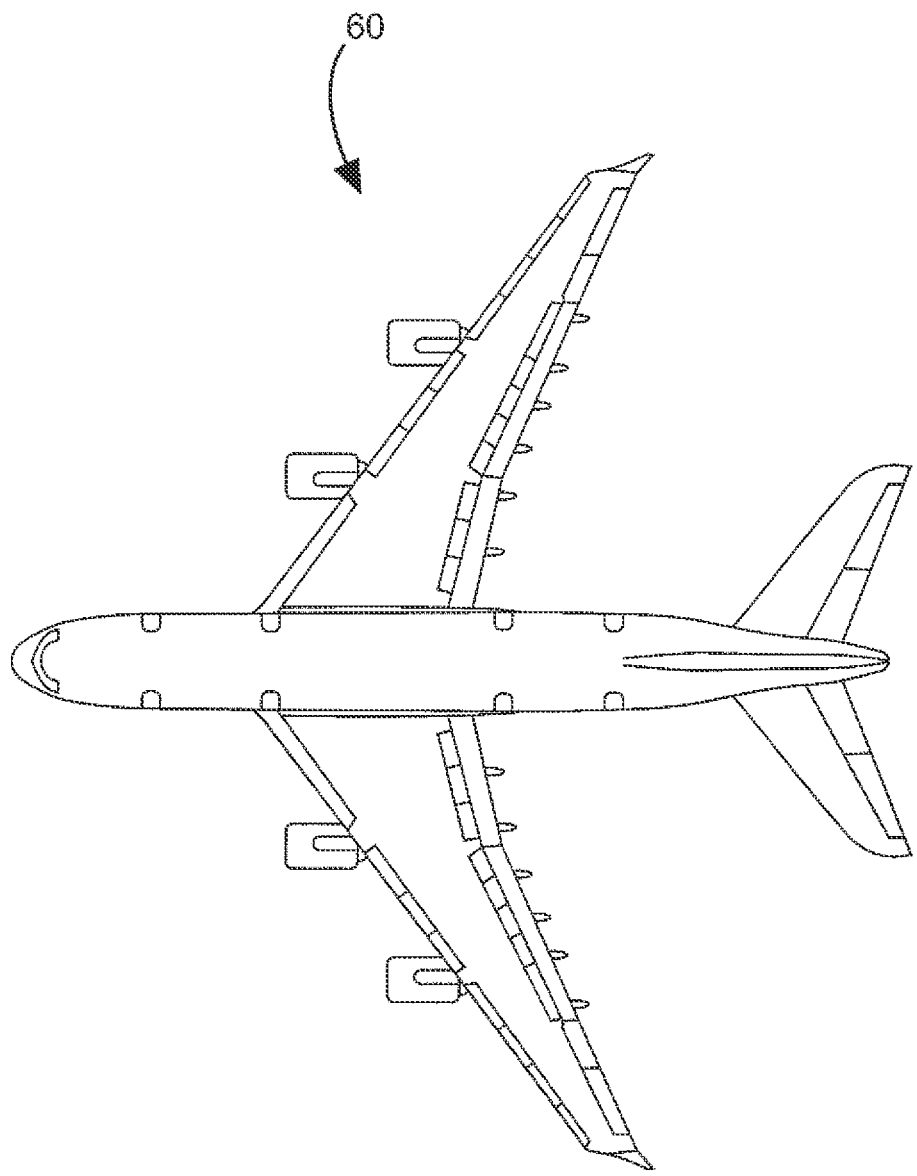
FIG. 6 shows an aircraft comprising an air conditioning system, an air distribution system and at least one ice separator according to an embodiment of the invention.

Finally, FIG. 6 shows an aircraft 60 that comprises at least one air conditioning system according to FIG. 4 and that by way of at least one air distribution system 54 guides air to a multitude of air outlets, wherein branching pieces 56 are used that by means of the concept of the invention have assumed the function of ice separators or that assume this function on the basis of the characteristics that are significant in the context of the invention.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An ice separator, comprising:
   a first airflow deflection surface that is continuously curved and has an introduction region arranged on a front edge of the first airflow deflection surface;
   a discharge region arranged on a rear edge of the first airflow deflection surface;
   an inflow edge defined between the front edge and the rear edge of the first airflow deflection surface;

an inflow aperture extending from the inflow edge and downstream of the inflow edge, the inflow aperture having a surface that is offset from the first airflow deflection surface; and a trapping pocket coupled to the inflow aperture so as to extend downstream of the inflow aperture, wherein a front edge tangent of the first airflow deflection surface and a rear edge tangent of the first airflow deflection surface is adapted to form an angle of less than approximately 180° relative to each other, and wherein the trapping pocket is arranged on a side of the first airflow deflection surface that faces away from a centre of curvature of the first airflow deflection surface.

2. The ice separator of claim 1, wherein the angle enclosed between the front edge tangent and the rear edge tangent is adapted to range from approximately 90° to approximately 135°.

3. The ice separator of claim 1, further comprising a rounded leading edge that is arranged so as to be substantially flush on the front edge of the first airflow deflection surface.

4. The ice separator of claim 1, further comprising a second airflow deflection surface having a second front edge arranged substantially parallel and adjacent to the front edge of the first airflow deflection surface.

5. The ice separator of claim 4, wherein the second airflow deflection surface is arranged so as to be mirror-inverted and symmetrical relative to the first airflow deflection surface.

6. The ice separator of claim 4, wherein a leading edge is arranged substantially flush against the front edge of the first airflow deflection surface and the front edge of the second airflow deflection surface.

7. The ice separator of claim 1, wherein the trapping pocket comprises an open-pore material.

8. The ice separator of claim 7, wherein the trapping pocket comprises a mesh fabric.

9. The ice separator of claim 1, wherein the first airflow deflection surface comprise an open-pore material.

10. The ice separator of claim 4, wherein the second airflow deflection surface comprises an open-pore material.

11. The ice separator of claim 1, wherein the ice separator is adapted to provide a sound-insulating deflection of airflows in air ducts.

12. An air distribution system, comprising:
a main air duct;
at least two secondary air ducts;
a sound-insulating air branching piece including a first airflow deflection surface that is continuously curved with an introduction region arranged on a front edge of the first airflow deflection surface, and a discharge region arranged on a rear edge of the first airflow deflection surface;
an inflow edge defined between the front edge and the rear edge of the first airflow deflection surface;
an inflow aperture extending from the inflow edge and downstream of the inflow edge, the inflow aperture having a surface that is offset from the first airflow deflection surface; and
a trapping pocket coupled to the inflow aperture so as to extend downstream of the inflow aperture,
wherein the sound-insulating air branching piece is arranged between the main air duct and the at least two secondary air ducts, and leads air from the main air duct to the at least two secondary air ducts,
wherein a front edge tangent and a rear edge tangent of the first airflow deflection surface is adapted to form an angle of less than approximately 180° relative to each other, wherein the trapping pocket is arranged on one side of the first airflow deflection surface that faces away from a centre of curvature of the first airflow deflection surface, and wherein the first airflow deflection surface comprises an open-pore material.

13. An aircraft, comprising
an air conditioning system comprising an air conditioning pack, a mixing chamber for mixing air from a cabin of the aircraft with fresh air;
an air distribution system comprising a main air duct, at least two secondary air ducts and a sound-insulating air branching piece;
an air branching piece arranged between the main air duct and the at least two secondary air ducts that leads air from the main air duct to the at least two secondary air ducts;
an ice separator comprising a first airflow deflection surface that is continuously curved with an introduction region arranged on a front edge of the first airflow deflection surface, and a discharge region arranged on a rear edge of the first airflow deflection surface;
an inflow edge defined between the front edge and the rear edge of the first airflow deflection surface;
an inflow aperture extending from the inflow edge and downstream of the inflow edge, the inflow aperture having a surface that is offset from the first airflow deflection surface; and
a trapping pocket coupled to the inflow aperture so as to extend downstream of the inflow aperture,
wherein a front edge tangent and a rear edge tangent of the first airflow deflection surface is adapted to form an angle of less than approximately 180° relative to each other,
wherein the trapping pocket is arranged on one side of the first airflow deflection surface that faces away from a centre of curvature of the first airflow deflection surface, and
wherein the first airflow deflection surface comprises an open-pore material.

14. The aircraft of claim 13, wherein the angle enclosed between the front edge tangent and the rear edge tangent is adapted to range from approximately 90° to approximately 135°.

15. The aircraft of claim 13, further comprising a rounded leading edge that is arranged so as to be substantially flush on the front edge of the first airflow deflection surface.

16. The aircraft claim 13, further comprising a second airflow deflection surface having a second front edge arranged substantially parallel and adjacent to the front edge of the first airflow deflection surface.

17. The aircraft of claim 16, wherein the second airflow deflection surface is arranged so as to be mirror-inverted and symmetrical relative to the first airflow deflection surface.

18. The aircraft of claim 16, wherein a leading edge is arranged substantially flush against the front edge of the first airflow deflection surface and the front edge of the second airflow deflection surface.

19. The aircraft of claim 15, wherein the trapping pocket comprises the open-pore material.

20. The aircraft of claim 19, wherein the trapping pocket comprises a mesh fabric.

* * * * *